United States Patent Office 3,430,831
Patented Mar. 4, 1969

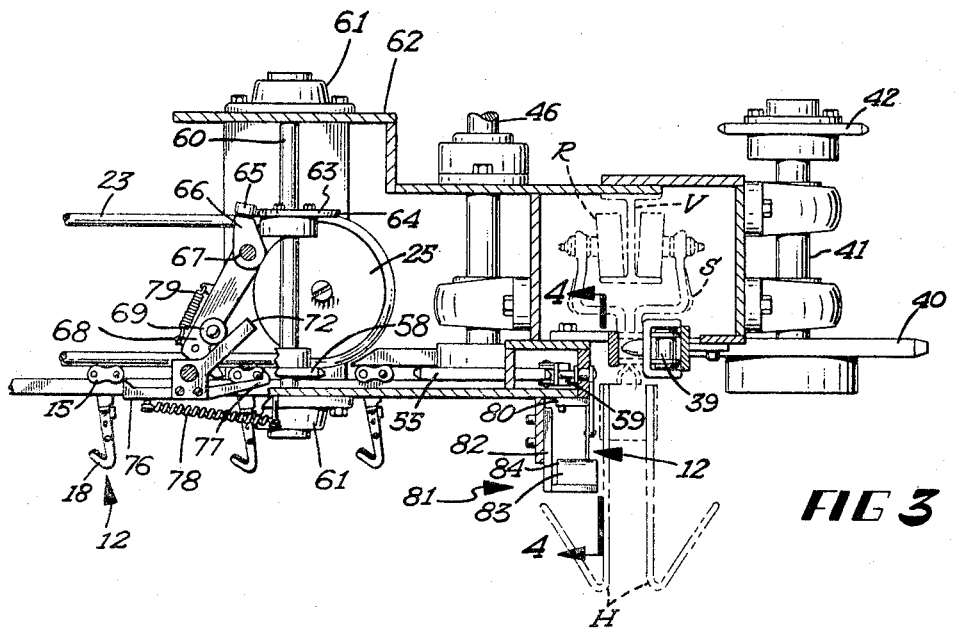
FIG 3
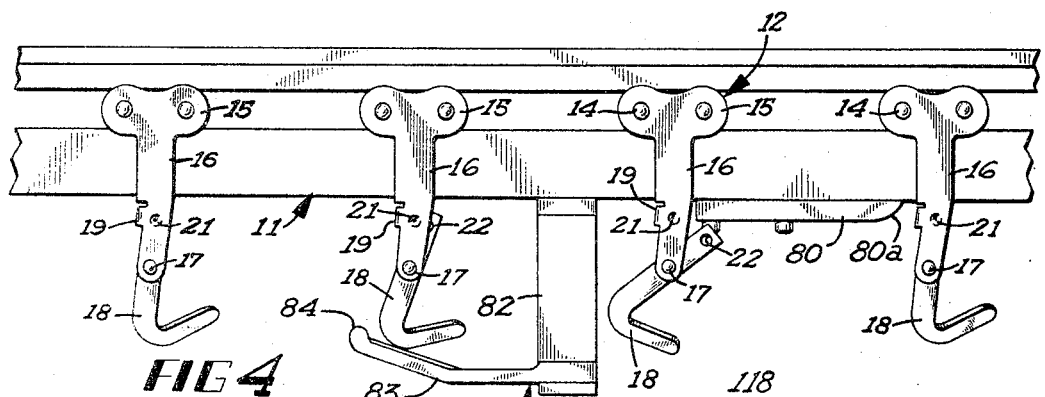
FIG 4
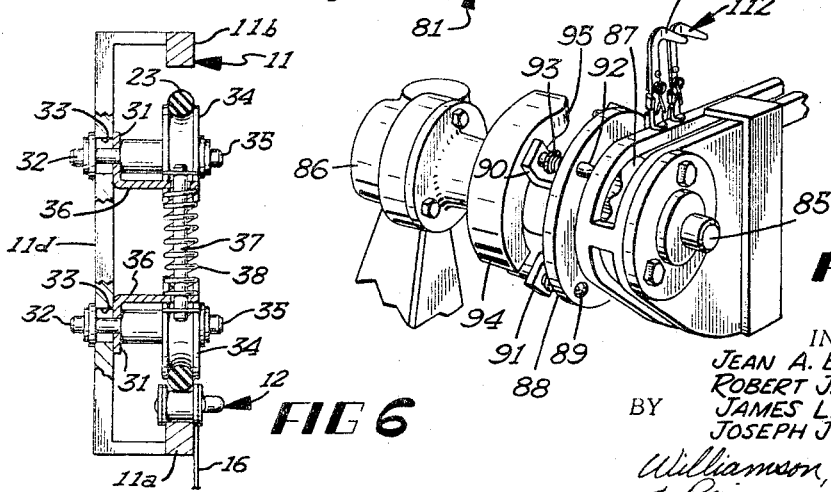
FIG 6
FIG 9
INVENTORS
JEAN A. BURTON,
ROBERT J. GEPPERT,
JAMES L. FARMER
JOSEPH J. MATHIS
BY Williamson, Palmatier & Bains
ATTORNEYS

3,430,831
TRANSFER DEVICE FOR A FRANK-O-MATIC SYSTEM
Jean A. Burton, Austin, Robert J. Geppert and James L. Farmer, Minneapolis, and Joseph J. Mathis, St. Paul, Minn., assignors, by direct and mesne assignments, to Geo. A. Hormel & Company, Austin, Minn., a corporation of Delaware
Filed July 13, 1967, Ser. No. 653,163
U.S. Cl. 226—105    7 Claims
Int. Cl. B65h

ABSTRACT OF THE DISCLOSURE

A transfer device comprising a plurality of hooked shaped conveyor members mounted on an endless track which extends between the sausage making machine and cooking conveyor, the hook shaped conveyor members receiving and supporting elongate sections of sausage links from a sausage making machine, and transferring the sections of sausage links to a moving cooking conveyor. An endless belt engaging the conveyor member to move the same along the track but releasing the conveyor members adjacent the cooking conveyor. An escapement mechanism controlling movement of each conveyor member adjacent the cooking conveyor to permit controlled transfer of the sections of sausage links of the cooking conveyor.

---

This invention relates to an apparatus automatically transferring sausage links from the link forming machine to a cooking conveyor.

Machines have been developed for encasing sausages and the like and these machines are operable to fill the casing with a product and to divide the casing into links which links are then transferred to a cooking conveyor for cooking. One type of link forming machine is illustrated in U.S. Patents No. 3,115,668 and 3,191,222, and it will be noted that the sausage links which are produced by this type of machine are looped over a linking conveyor which is positioned in close proximity to the helical through which the links are discharged. Long sections or lengths of the linked sausages are discharged from the link forming machine onto the linking conveyor and these sections are arranged in looped fashion. Thereafter, the loops are manually transferred from the linking conveyor to the cooking conveyor where the products are thereafter cooked and/or smoked. This manual transfer of the loops of sausage links from the linking conveyor to the smoking and cooking conveyor is time consuming and also involves a substantial expenditure in labor.

It is therefore a general object of this invention to provide an automatic transfer device for continuously receiving loops of link sausages from the sausage forming machine and for continuously and automatically transferring these loops to a smoking and cooking conveyor.

A more specific object of this invention is to provide a transfer device for transferring uncooked sausage links from a link forming machine to a cooking and smoking conveyor, wherein the links are supported from a plurality of support members with means for moving the members along a track so that the sausage links suspended therefrom may be transferred during movement thereof to a smoking and cooking conveyor.

These and other objects and advantages of this invention will more fully appear from the following description made in connection with the accompanying drawings wherein like reference characters refer to the same or similar parts throughout the several views, and in which:

FIG. 3 is a cross-sectional view taken approximately along lines 3—3 of FIG. 2 and looking in the direction of the arrows;

FIG. 4 is a sectional view taken approximately along lines 4—4 of FIG. 3 and looking in the direction of the arrows;

FIG. 5 is a perspective view of one of the conveyor members illustrating the details of construction thereof;

FIG. 6 is a cross-sectional view on an enlarged scale taken approximately along lines 6—6 of FIG. 1 and looking in the direction of the arrows;

FIG. 7 is a perspective view similar to FIG. 5 but illustrating a modified form of the conveyor member;

FIG. 8 is a fragmentary perspective view of a portion of the transfer device; and FIG. 9 is a perspective view of a form of the infeed end portion of the transfer device.

Figure 1:
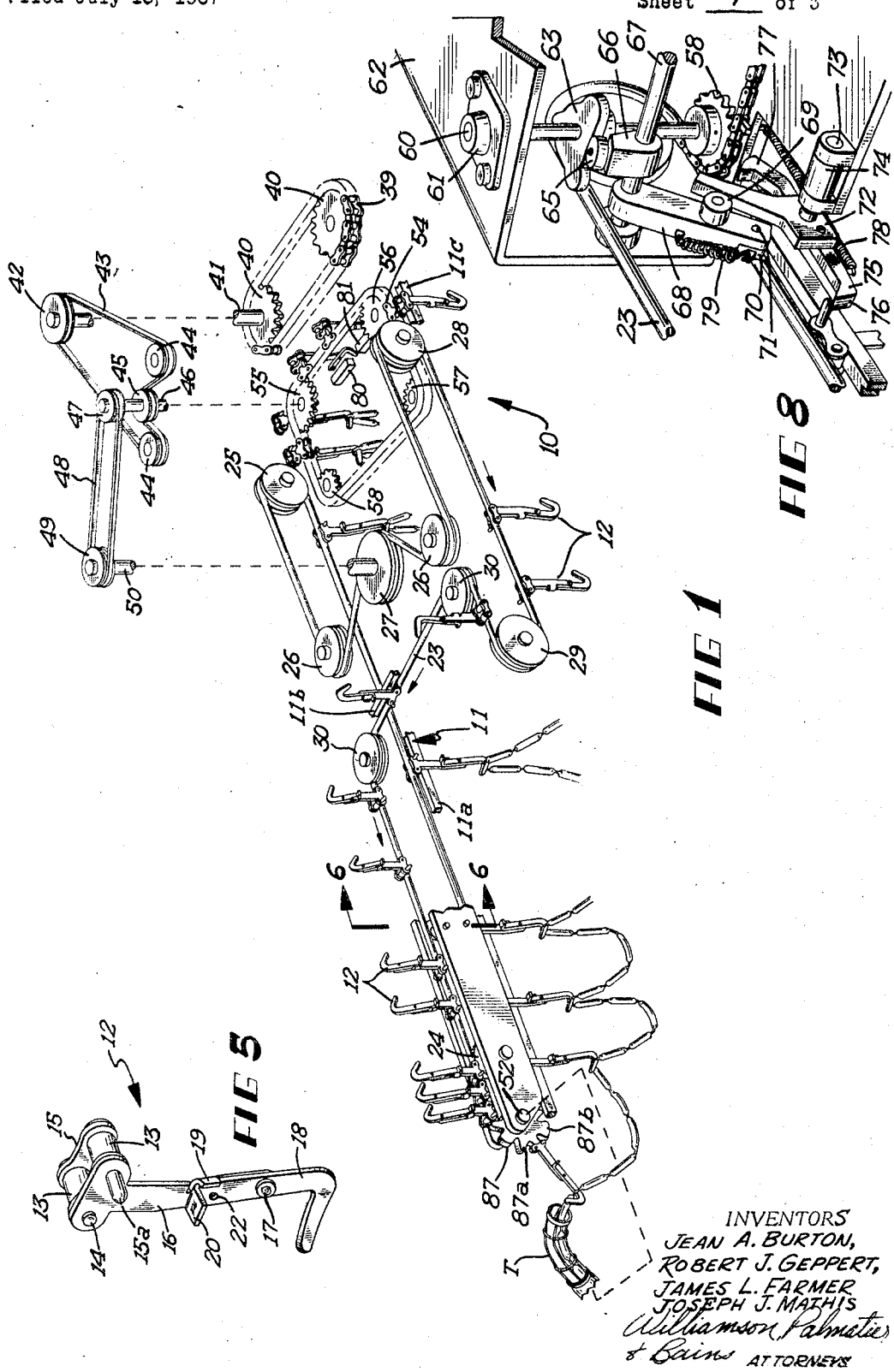
FIG. 1 is a diagrammatic perspective view of the transfer device.

Referring now to the drawings and more specifically to FIG. 1, it will be seen that one embodiment of the novel transfer device designated generally by the reference numeral 10 is there shown. This transfer device is adapted to receive sausage links from the helical conveyor tube T of the type used in conjunction with sausage forming machines illustrated in U.S. Letters Patent No. 3,115,668 and 3,191,222. The device 10 includes a continuous endless track structure 11 which is horizontally oriented and serves to guide and support a plurality of similar conveyor members 12.

Referring now to FIG. 5 it will be seen that each conveyor member 12 includes a pair of rollers 13 having pins or axles 14 that are journalled between a pair of support plates 15. One of the support plates 15 for each conveyor member has a depending attachment portion 16 integrally formed therewith and this attachment portion is pivotally connected by pivot 17 to a generally hook shaped support element 18. Each attachment portion 16 has a laterally projecting cam and stop element 19 integrally formed therewith and projecting outwardly therefrom and each support element 18 also has a stop element 20 integrally formed with the upper end thereof and projecting outwardly therefrom. Thus, elements 19 and 20 cooperate with each other to limit pivotal swinging movement of the support element 18 in one direction.

Each support element 18 also has a detent 21 integrally formed with the upper portion thereof and each attachment portion 16 also has a recess 22 therein which receives the detent 21 therein with snap coupling effect when the support element 18 is disposed in substantially aligned relation with the associated attachment portion as illustrated in FIG. 5. The support elements 18 are also swingable from an aligned supporting position to a pivoted release position, these positions being clearly illustrated in FIG. 4.

It will be noted that the conveyor members 12 are supported on the continuous endless track structures 11 and are moved from a loading or infeed station located adjacent the helical conveyor tube T to a release position located in close proximity and parallel to the smoking and cooking conveyor.

It will be noted that the conveyor members 12 are not interconnected to each other in the manner of a conveyor chain and means are provided for moving the conveyor members continuously over the endless track structure 11. To this end, it will be seen that an elongate flexible endless drive belt 23 is provided and this drive belt is trained over a vertically disposed pulley 24 revolvable about a horizontal axis and which is positioned against the infeed or loading station of the transfer device 10.

The endless drive belt 23 is actually arranged in upper and lower runs and the lower run thereof is positioned in close proximity to the endless track structure 11 and extends forwardly from the pulley 24 and is trained rearwardly about another vertically disposed pulley 25 which is revolvable about a substantially horizontal axis. It will be noted that this lower run of the drive belt 23 extends in close proximity to and substantially parallel to the lower track of the continuous endless track structure 11 but upon being trained about the pulley 25 extends rearwardly away from the lower track of the track structure. To this end, it will be seen that the track structure 11 includes a lower track 11a and an upper track 11b, the upper track being of substantially L-shaped configuration while the lower track is substantially longer than the upper track. The lower track also includes a transfer portion 11c which is disposed substantially parallel to the cooking conveyor and in close proximity to a portion thereof.

It will be noted that after the belt 23 is trained about the pulley 25, the belt is thereafter trained about a pair of horizontally oriented pulleys 26 which are revolvable about a substantially vertical axis. An intermediate pulley 27 is interposed between the pulleys 26 and is also horizontally oriented. The endless belt then extends forwardly from one of the pulleys 26 and is trained about a vertically oriented pulley 28 and then again extends rearwardly and is trained about a second vertically oriented pulley 29 spaced rearwardly and substantially in alignment with the pulley 28. Thereafter, the belt is trained around a pair of horizontally oriented pulleys 30 and then around pulley 24. It will be noted that that portion of the endless belt which extends between the pulleys 30 and the pulley 24 constitutes the upper run thereof while the remaining portion of the endless belt constitutes the lower run thereof. It will be noted that the pulley 25 and 28 are disposed in substantial alignment and the endless track structure extends beyond these pulleys and other means are used to move the conveyor members 12 along the transfer portion 11c.

Referring now to FIG. 6 it will be seen that the endless drive belt 23 frictionally engages the conveyor members 12 and in a manner so that the rollers 13 thereof will be clamped against the endless track structure 11. Thus, as the endless belt 23 is moved in a predetermined direction, the conveyor members 12 will be accordingly moved along the endless track structure 11.

Means are provided which yieldably support the drive belt in close proximity to either the upper or lower track, and this means includes yieldable rollers that are capable of vertical movement relative to the endless track structure. Referring again to FIG. 6, it will be seen that the upper and lower tracks 11a and 11b are interconnected together adjacent the infeed end portion of the device by a vertical panel or strip 11d.

Longitudinally projecting arms 31 are secured to the vertical strip 11b by suitable pins 32 which protect through slots 33 in the vertical strip portion 11d. This arrangement permits limited vertical translation of the arms 31 relative to the vertical strip portion 11b. Each arm 31 also has small rollers or pulleys 34 revolvably mounted on the respective ends thereof by suitable axles or pins 35, as best seen in FIG. 6. Each arm also has a small upturned flange 36 integrally formed adjacent the central portion thereof. These flanges 36 are apertured and each upper and lower pair of such flanges accommodate a vertical pin 37 through apertures therein. A helical spring 38 is positioned around each pin 37 and bears against each pair of upper and lower flanges 36 to urge the arms away from each other.

A plurality of such pulley supporting arms are provided so that the conveyor members will be continuously urged against the endless track structure and be driven by the endless drive belt. It will therefore be seen that the drive belt 23 while frictionally engaging and driving the conveyor members along the endless track structure is also capable of some yielding movement away from the track structure.

Means are also provided for driving the endless drive belt 23 to move the conveyor members along the endless track structure. In the embodiment shown, the endless drive belt is driven from the drive means for the cooking chain type conveyor as best seen in FIGS. 1 and 3. To this end, it will be seen that a small endless caterpillar type chain 39 is trained about a pair of sprockets 40 one of which is driven by the drive means for the cooking conveyor. One of the sprockets 40 has a shaft 41 projecting therefrom and this shaft has a sprocket 42 keyed thereto for rotation therewith. An endless drive chain 53 is trained about the sprockets 43 and also about a pair of smaller sprockets 44. The endless chain is also trained about an intermediate sprocket 45 which is keyed to a shaft 46 for revolving the latter. The shaft 46 also has a sprocket 47 keyed thereto for rotation therewith and a drive chain 48 is trained about the sprocket 47 and a second sprocket 49. It will be seen, that the sprocket 49 is keyed to a shaft 50 which constitutes a common shaft for the sprocket 27. It will therefore be seen that when the smoking conveyor is driven, the endless chain 39 will also be driven to drive the endless belt through the mediary of the chain and sprocket drive.

Referring again to FIGS. 1 and 9, it will be seen that means are also provided for very accurately controlling the conveyor members with respect to the helical conveyor tube of the link forming machines so that a loop of sausage links of predetermined size will be suspended over a single conveyor member. This means includes a revolvable escapement sprocket which when revolved, causes a single conveyor member to be moved to the lower track portion to support a predetermined length of sausage links which are discharged from the helical conveyor tube. In the embodiment shown, each conveyor member is positioned to support a length of eight links of uncooked sausage. The particular construction of the escapement sprocket control means will be more fully described hereinbelow.

It will be seen that as the conveyor members pass from the infeed station with loops of sausage products suspended therefrom, these conveyor members will be driven forwardly along the lower track by the endless drive belt but will become disengaged from the drive belt prior to reaching the transfer portion of the lower track. Means are provided for moving these conveyor members in timed relation with respect to the cooking and smoking conveyor so that the loops of sausage product may be accurately transferred to the loop supporting of the cooking conveyor.

Figure 2:
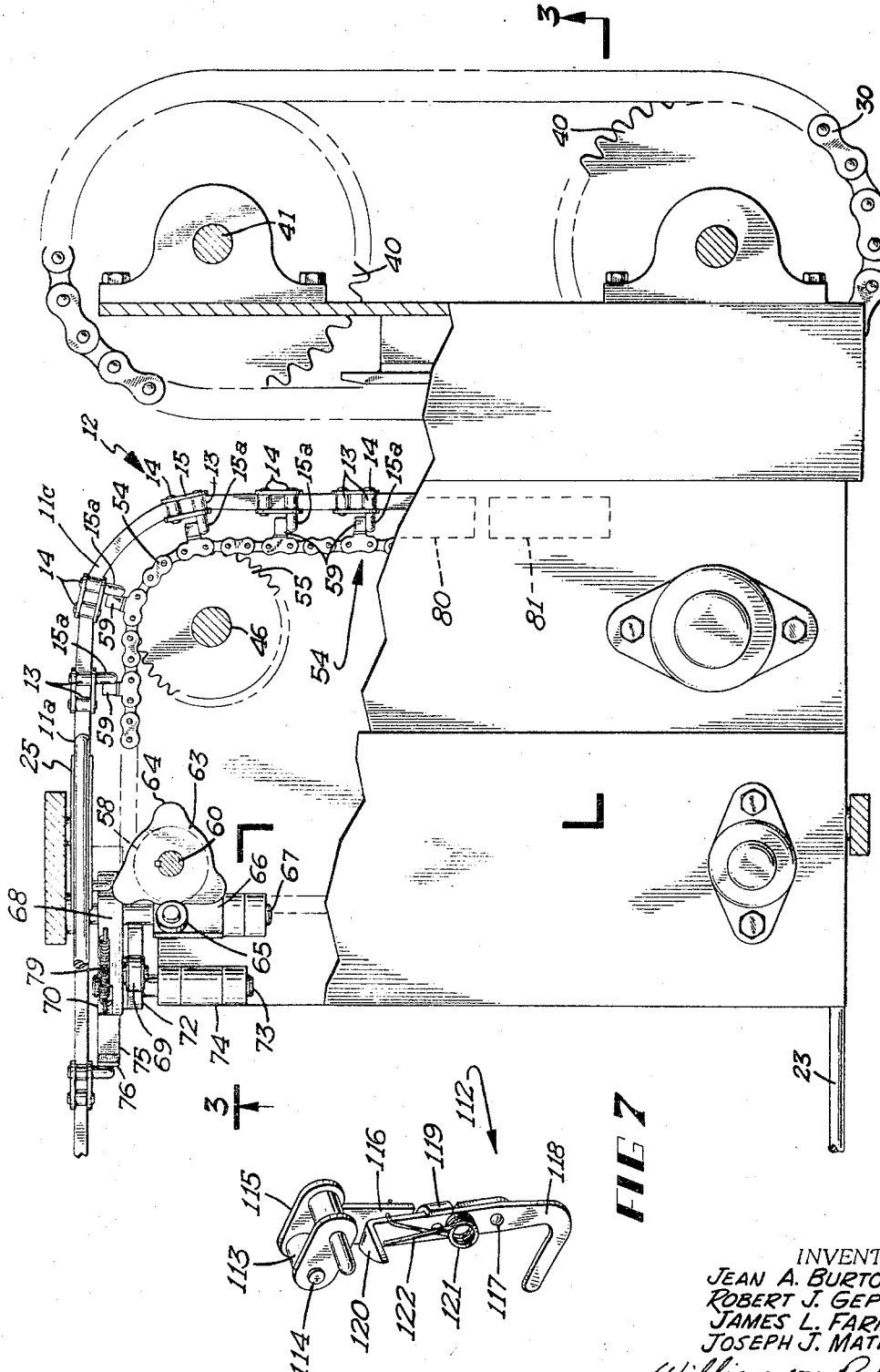
FIG. 2 is an enlarged fragmentary plan view of a portion of the transfer device.

This means for moving the conveyor members with the sausage links suspended therefrom in timed control relation with respect to the smoking and cooking conveyor, comprises an endless generally rectangular shaped timing chain 54 which is trained about sprockets 55, 56, 57 and 58. It will be noted, that the sprockets are horizontally oriented and that sprocket 56 is keyed to the shaft 46 to be revolved therewith so that the endless timing chain is driven from the cooking and smoking conveyor. Referring now to FIG. 2 it will be seen that certain selected links of the timing chain 54 are each provided with an outwardly projecting finger 59. It will be noted, that each of the conveyor members 12 is also provided with an outwardly projecting finger-engaging element 15a which projects outwardly beyond one of the side plates 15. Each finger-engaging element 15a is engaged by one of the fingers 59 so that each conveyor member will be moved along the transfer portion 11c of the endless track structure 11. The spacing between the fingers 59 and the speed at which the timing chain 54 is moved, is such that the movement of these conveyor members 12 is synchronized with movement of the smoking and cooking conveyor.

It will be noted also, that just before the conveyor members 12 become disengaged from frictional driven relation with respect to the endless drive belt 23 prior to movement along the discharge portion of the lower track 11a, means are provided for engaging, retaining and releasing the conveyor members, one at a time, so that only one conveyor member 12 with sausage links supported thereby will be engaged by single finger 59 on the timing chain 54.

Referring now to FIGS. 2, 3 and 8, it will be seen that the sprocket 58 is keyed to a vertically disposed shaft 60 which is journalled in suitable bearings 61 that are fixedly mounted on the upper and lower plates of frame 62. An escapement cam 63 is also keyed to the shaft 60 intermediate the ends thereof above the sprocket 58. This cam 63 is of generally triangular shaped configuration and has three arcuate shaped camming lobes 64 projecting outwardly therefrom.

The peripheral surface of the cam 63 is engaged by a cam or roller follower 65 which is revolvably mounted on an arm 66. The arm 66 is keyed or otherwise fixed to a shaft 67 which is journalled in suitable bearings in the frame and which is positioned above the timing chain 54.

The shaft 67 also has one end of an elongate arm or lever 68 keyed thereto for movement therewith, and this arm is declined downwardly from the shaft. The arm 68 has a cam roller 69 revolvably mounted thereon by a suitable pin, the roller projecting from the innermost side of the arm 68. The lower end portion of the arm 68 is recessed to receive a small impeller element 70 which is pivotally secured to the arm 68 by a pivot 71 to permit pivoting movement relative thereto. It will be noted, that the impeller element 70 projects forwardly of the lower end portion of the arm and is adapted to engage the rearmost roller of each conveyor member 12 as the latter is moved into the position to be moved along the transfer portion 11c of the endless track structure.

An elongate arm 72 is pivoted on a shaft 73 which is journalled in a suitable bearing unit 74 mounted on the support frame 62. It will be noted, that the arm 72 projects upwardly and forwardly from the shaft and is engaged by the cam roller 69. An elongate lever 75 is rigidly attached to the lower end portion of the arm 72 and the rear end portion of the lever has a hook element 76 integrally formed therewith and projecting upwardly therefrom. Referring now to FIG. 3, it will be seen that the forward end portion of the lever 75 is inclined slightly upwardly and terminates in the hook element 77. An elongate helical spring 78 has one end thereof affixed to a pin secured to the rear end portion of the lever 75 and projecting downwardly therefrom. The other end of the spring is secured to a pin that projects downwardly from the lower surface of the frame 62. It will also be noted that a small helical spring 79 has one end thereof secured to an ear affixed to the median portion of the arm 68, while the other end of the spring 79 is secured to a small ear which is integrally formed with the impeller element 70.

It will be seen that when the shaft 60 is revolved, one of the cam lobes 64 will engage the cam follower or roller 65 and shift the cam roller and arm 66, thereby causing pivoting movement of the rock shaft 67. The lever or arm 68 will then be caused to swing in a counterclockwise direction as viewed in FIG. 3, thus urging the impeller element 70 forwardly to shift one of the conveyor members 12 in a forward direction. As this occurs, the cam roller 69 will urge the cam 72 downwardly or in a clockwise direction as viewed in FIG. 3, thereby causing downward swinging movement of the hook 77 and upward swinging movement of the hook 76. The conveyor member, which is being retained by the hook element 77 will be released while the next adjacent conveyor member will be moved into a position to be retained by the hook element 77. The hook element 76 will be urged upwardly during this action to prevent escapement of the next adjacent conveyor member. This movement of the arm 72 and lever 75 is resisted by the helical spring 77.

The impeller element 70 will have its forward end portion capable of yielding upwardly as the impeller element slides rearwardly over the conveyor member that is now being retained by the hook element 77.

As pointed out above the speed of the timing chain 54 is synchronized with movement of the cooking conveyor C. The cooking conveyor is of a chain type including roller type chain links R which are movable in a track T and which links have suspension members S pivotally secured thereto and which support the conventional conveyor hooks H. Since the conveyor members 12 will be moved in synchronized relation with respect to the hooks H of the smoking and cooking conveyor, when the support element 18 is pivoted relative to its attachment portion to the release position, then the section of uncooked linked sausages suspended thereby will be released therefrom and transferred to one of the hooks H of the cooking conveyor.

Means are therefore provided for producing swinging movement of the support element 18 of each conveyor member from the aligned supporting position to the release position, and this means includes a cam 82 having a lower camming edge the front surface portion 80a thereof curved and extending downwardly in the direction of travel of the conveyor member. The cam 80 is positioned in obstructing relation with respect to the camming element 20 so that when the camming element 20 is engaged by the cam 80, the support element 18 will be swung to the position illustrated by the conveyor member 12 located second from the right as seen in FIG. 4. It is pointed out that the lower end hook portions of the support elements 18 will be positioned above the hooks H of the cooking conveyor. Therefore as the support elements are moved to the release position, the loop of sausages carried thereby will be very accurately and nicely transferred to the cooking conveyor.

Means are also provided for returning the support elements 18 to their aligned locked position with respect to the attachment portion 16, and this means also includes a cam 81 which is secured to the track structure 11 by means of a bracket 82. The cam 81 is formed from a flat metal plate and includes an upwardly inclined portion 83 disposed in obstructing relation with respect to the support elements 18 and terminates in a terminal arcuate portion 84 which projects upwardly beyond the upper end of the inclined portion 83. It will be noted, that as each conveyor member 12 is moved on the transfer portion 11c of the track structure 11 and after release of the loop of sausages therefrom, the support element 18 even though in the released pivoted position will engage the inclined portion 83 of the cam 81 will be progressively swung to an aligned position. As the support element 18 is moved over the terminal element 84 of the cam 81 the detent 21 will be urged into locking relation with respect to the recess 22, so that the support element will be releasably locked with respect to the attachment portion 16.

Referring now to FIGS. 1 and 9, it will be seen that the escapement control means comprises a shaft 85 which is drivingly connected to a drive means 86 including a gear train which is in turn driven by the drive means that revolves the helical conveyor tube of the sausage forming machine. An escapement sprocket 87 is keyed to the shaft 86 for rotation therewith and this escapement sprocket 87 has a plurality of teeth formed in the periphery thereof. In the embodiment shown, the escapement sprocket includes a plurality of pointed teeth 87a, which are disposed in alternating relation with respect to a plurality of blunter teeth 87b. The configuration of these teeth is such that the teeth will engage the rollers of the conveyor members to move the same along the endless track in a controlled manner.

An annular member 88 is also keyed to the shaft 85 for rotation therewith and is spaced axially from the escapement sprocket 87, but is disposed in relative close proximity thereto. This annular member 88 has a plurality of apertures 89 therein. A plurality of L-shaped brackets 90 are each secured to the outer face of the annular member 88 and it will be noted that these brackets are spaced circumferentially with respect to each other. The upturned outer leg 91 of each bracket is provided with an aperture and one end of an elongate pin 92 projects through the aperture in the leg 91 and the other end of the pin is movable through the aperture 89 and the annular member 88. Each pin 92 has a helical spring 93 positioned therearound, one end of the spring engaging the annular member 88 and the other end of the spring engaging a collar on pin 92 to normally urge the pin 92 in an axial direction away from the escapement sprocket 87.

An arcuate cam member 94 is rigidly mounted on the shaft housing, which is secured to the housing for the drive means 86, as best seen in FIG. 9. The leading edge of the cam member 94 is curved outwardly as at 95, whereby when the shaft 85 is rotated, each pin, which is normally urged away from the escapement sprocket 87, will be engaged by the cam and will be progressively urged inwardly. This causes the pin to engage the rearwardly disposed roller of a conveyor member 12 to move the conveyor member so that it is engaged by one of the teeth on the escapement sprocket, thereby permitting the conveyor members to be moved by the escapement sprocket into a position whereby the conveyor member may receive and support the sausage links from the helical conveyor tube T. With this arrangement, control of the conveyor members is accomplished so that there will be little tendency for the conveyor members to bind or improperly interlock with the escapement sprocket.

During use of the transfer device 10, elongate sections of uncooked sausage links will be discharged through the helical conveyor tube T of the link forming machine and will be suspended upon the conveyor members 12. The escapement sprocket 11 will space the conveyor members 12 relative to each other so that the long sections of link sausages looped over these conveyor members will be evenly supported by the conveyor members. The endless drive belt 23 will urge the conveyor members along the track structure towards the transfer portion thereof.

Just prior to disengagement of the drive belt from the conveyor members, each conveyor member will be engaged by the hook element 77 on the lever 75 and will be releasably retained thereby until released by the action of the cam and cam follower. As each conveyor member is released, the drive belt will urge the conveyor member forwardly until the conveyor member is engaged by one of the fingers 59 on the timing chain 54. The timing chain will move the conveyor members along the transfer portion where each conveyor member will engage the cam 80 and the support element 18 thereof will be pivoted relative to the attachment portion to release and drop the loop of sausages therefrom upon the hooks H of the cooking conveyor. Thereafter, the support element of each conveyor member will engage the cam 81 and be urged to the aligned position relative to the associated attachment portion and releasably locked therewith.

The use of a friction drive belt permits the conveyor members to be driven and individually released with respect to the supporting track structure and also permits slippage between the belt and conveyor members at certain points therealong. For example, slippage can occur between the belt and conveyor members when the hook element 77 on the lever 75 engages the conveyor members to retain the same against movement along the track structure. Similarly, slippage can occur between the drive belt and the individual conveyor members as the escapement sprocket 51 retains the conveyor members against movement relative to the track. With this arrangement, it will be seen that a very effective means has been provided for automatically receiving the long sections of raw linked sausages and for conveying and transferring these sausages to a cooking conveyor where these sausages are further processed. This particular system obviates the need of a worker or workers for manually transferring the sausages formed by the link forming machine.

Referring now to FIG. 7, it will be seen that a modified form of the conveyor member is there shown, and is designated by the reference numeral 112 and also includes a pair of rollers 113 having pins or axles 114 journalled between a pair of support plates 115. One of the support plates 115 of each of these conveyor members has a depending portion 116 integrally formed therewith and this attachment portion is pivotally connected by a pivot 117 to a generally hook-shaped support element 118. Each attachment portion 116 has a laterally projecting cam and stop element 119 integrally formed therewith. Similarly, each support element 118 also has a stop element 120 integrally formed with the upper end thereof and projecting outwardly therefrom. In the modified form of the support element, a coil spring 121 is provided and has a pair of arms 122 extending therefrom. The end of one of the arms 122 extends through an opening in the attachment portion 116 while the end of the other arm extends through an opening formed in the upper portion of the support element 118. With this arrangement, the hook portion is normally urged into co-extensive relation with respect to the attachment portion by the spring 121, but the spring permits yielding of the hook portion about its pivotal axis. When this modified form of the conveyor member is used, it is unnecessary to use a return cam, such as a cam 81 for returning the hook portion to its aligned position.

It will therefore be seen from the foregoing description that we have provided a novel transfer device which is operable for very effectively transferring linked products, such as sausages, from a link forming machine to a cooking conveyor during operation of the cooking conveyor and the link forming machine.

It will further be seen that this novel transfer device is not only of simple and inexpensive construction, but one which functions in a more efficient manner than any heretofore known comparable device.

It will, of course, be understood that various changes may be made in the form, details, arrangement and proportions of the various parts without departing from the scope of our invention.

What is claimed is:

1. Apparatus for transferring elongate sections of link sausages from a sausage making machine to a cooking conveyor having support elements for supporting the sausage link sections, said apparatus comprising an elongate endless track structure including a pickup portion positioned adjacent the sausage making machine and a transfer portion disposed in close proximity to the cooking conveyor, a plurality of conveyor members mounted on said track structure for movement therealong and each conveyor member being adapted to have an elongate section of link sausage looped therearound to be suspended therefrom, means engaging and moving the conveyor members along said track structure and synchronizing movement of the conveyor members with movement of the cooking conveyor as the conveyor members are moved along said transfer portion of the track structure, said conveyor members being operable during movement thereof along said transfer portion to release the elongate sections of link sausages, whereby the latter are transferred to the support elements on the cooking conveyor.

2. The apparatus as defined in claim 1 wherein each of said conveyor members includes a support element which is shiftable between support and release positions, and cooperating means on said track and each support element of each conveyor member for shifting each support element between said support and release positions during movement of the conveyor members along the transfer portion of the track structure.

3. The apparatus as defined in claim 1 wherein said means engaging and moving the conveyor members along said track structure includes an endless belt frictionally engaging the conveyor members to move the same along the track structure from adjacent said pickup portion to the transfer portion of the track structure, said belt becoming disengaged from the conveyor members adjacent said transfer portion of the track structure, and thereafter engaging each conveyor member after the same has been moved through said transfer portion of the track structure.

4. The apparatus as defined in claim 3 and timing mechanisms engaging each conveyor member for moving the same along the transfer portion of the track structure in synchronized relation with the cooking conveyor and releasing each conveyor member after it has been moved through the transfer portion of the track structure.

5. The apparatus as defined in claim 1 wherein each of said conveyor members comprises a roller mounted on said track structure for movement relative thereto, an attachment portion secured to said roller for movement therewith, and a hooked-shaped support element pivotally connected with said attachment portion for swinging movement relative thereto between support and release positions, cooperating cam means on each support element and track structure to cause pivoting movement of each support element between support and release positions as each conveyor member is moved along the transfer portion of said track structure.

6. The apparatus as defined in claim 1 and an escapement mechanism operable to engage each conveyor member adjacent the pickup portion of said track structure to space the conveyor members a predetermined distance apart.

7. The apparatus as defined in claim 4 wherein said timing mechanism includes an endless timing chain having a plurality of spaced apart fingers affixed thereto for movement therewith and projecting outwardly therefrom, each finger engaging one of said conveyor members as the latter become disengaged from said endless belt to move each conveyor member at a predetermined rate along the transfer portion of said endless track structure.

References Cited

UNITED STATES PATENTS

| | | | |
|---|---|---|---|
| 257,703 | 5/1882 | Hilbers | 226—104 |
| 3,125,017 | 3/1964 | Tauber et al. | 198—177 X |
| 3,204,844 | 9/1965 | Wallace | 226—104 |

ALLEN N. KNOWLES, *Primary Examiner.*